Patented Aug. 23, 1932

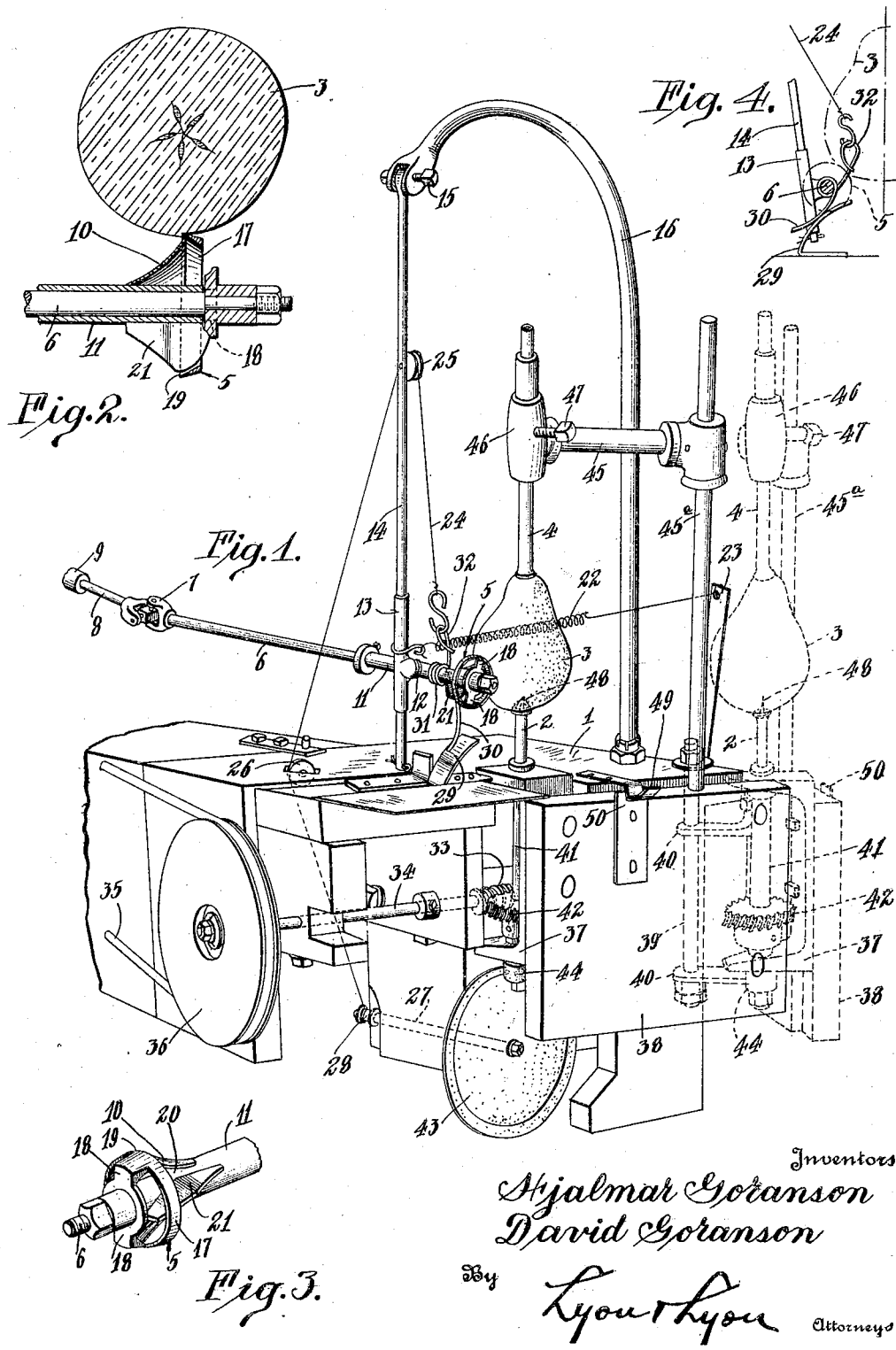
Aug. 23, 1932. H. GORANSON ET AL 1,872,731
FRUIT PEELING MACHINE
Filed June 28, 1926

1,872,731

UNITED STATES PATENT OFFICE

HJALMAR GORANSON AND DAVID GORANSON, OF SAN JOSE, CALIFORNIA, ASSIGNORS TO CALIFORNIA PACKING CORPORATION, OF SAN FRANCISCO, CALIFORNIA, A CORPORATION OF CALIFORNIA

FRUIT PEELING MACHINE

Application filed June 28, 1926. Serial No. 118,952.

This invention relates to a machine for peeling edible objects such as fruit and vegetables, and the term fruit is employed herein to designate any and all such edible objects. While features of the invention are applicable to machines for peeling fruits of different kinds, the invention is particularly adapted for peeling elongated fruit, such as pears.

The general object of the invention is to provide simple means for supporting a knife or cutter in contact with the face of the fruit, and for producing a relative movement between the knife and the fruit to move the cutter progressively along the face of the fruit, and to provide relative rotary movement between the knife and the fruit to attain the effect of passing the knife around the same; also to provide simple means for guiding the cutter or knife so as to regulate the pressure of the knife against the side of the fruit.

One embodiment of the invention contemplates the use of a rotary spindle which carries the fruit and rotates it on an axis. An object of the invention is to provide means for supporting this spindle in such a way that its driving connection can be readily broken to effect the stopping of the spindle and to facilitate the removal of the peeled fruit and the placing of the unpeeled fruit on the spindle.

Another object of the invention is to provide a rotary knife or cutter of simple construction which can be readily guided and controlled to effect the peeling of fruit.

Further objects of the invention will appear hereinafter.

The invention consists in the novel parts and relative combination of parts to be described hereinafter, all of which contribute to produce an efficient fruit peeling machine.

A preferred embodiment of the invention is described in the following specification, while the broad scope of the invention is pointed out in the appended claims.

In the drawing:

Figure 1 is a perspective of a machine embodying our invention, certain parts being broken away and others being shown in two positions by means of dotted outlines.

Figure 2 is a longitudinal section through the axis of the cutter or knife, and showing a cross section through the fruit to particularly illustrate the construction and mode of operation of the knife.

Figure 3 is a perspective of the rotary knife and further illustrating its construction.

Figure 4 is a vertical section through the cutter shaft and illustrating the mode of operation of the guide and feed for the cutter when it is peeling the under side of the fruit.

In practicing the invention, we provide means for relatively supporting the fruit and cutter to produce a relative rotation of the fruit and the knife with respect to the axis of the fruit. The knife is preferably of bent or curved form. We prefer to rotate the fruit on its longitudinal axis, and provide a peeling knife fixed relatively to the axis of the fruit, with means for supporting the same and pressing it lightly against the cheek or face of the fruit. As the fruit rotates on its axis, relative movement between the knife and the fruit occurs so that the knife moves along the fruit as the peeling operation progresses. In the present embodiment of the invention, the peeling knife is mounted so that it "floats" near the fruit, that is to say, the knife is not positively guided by the mechanism itself but is held by the mechanism against the fruit, a flexible connection being used for the cutter shaft which enables the knife to follow the profile or contour of the fruit while the knife is being driven.

In order to accomplish the foregoing, we prefer to provide a construction having the characteristic features illustrated in Fig. 1. This construction includes a frame or table 1 which supports a rotary spindle 2. The fruit 3 is held by means located on its axis and engaging the ends or sides only at two opposite points, that is, in the present instance, the fruit is held between the rotary spindle 2 and a fixed center or spindle 4, so that as the spindle 2 rotates, the fruit will be held so that it will rotate on its longitudinal axis, being held at the same time with this axis in a substantially vertical position.

We provide a cutter preferably in the form of a curved or bent knife 5 (see Fig. 2). This knife is mounted on a floating cutter shaft 6 which is relatively long and supported so that it extends in a plane transverse to the plane of the rotary spindle 2. The shaft 6 may be driven through a flexible connection 7 from a shaft 8 rotating in fixed bearings, one of which is indicated at the point 9.

By having the shaft 6 relatively long the knife keeps itself nearly in the middle plane of the fruit as it swings along the fruit. This gives most effective peeling of the fruit.

The knife includes a guard 10, which is relatively fixed, and this guard is held substantially against the side of the fruit (see Fig. 2). The guard 10 is carried on a sleeve 11 and this sleeve 11 has a swivel connection 12, on a horizontal pivot, with a substantially vertical sleeve 13. The connection to the sleeve 11 holds the guards 10 relatively fixed with respect to the knife. We provide means for guiding the vertical sleeve 13 so that it can move substantially parallel with the axis of the spindle 2. For this purpose, we provide guiding means in the form of a guide stem 14, which is suspended from above and swings like a pendulum toward or from the fruit. The upper end of the stem is therefore mounted to swing on a pivot bolt 15 carried on the end of a gooseneck formed at the upper end of a stanchion 16 carried on the frame or table.

The knife proper is in the form of a curved blade, preferably an annular blade 17 (see Figs. 2 and 3). This blade is connected by two arms 18 with the shaft 6 which rotates the blade. When the cutter is operating upon the fruit, the edge 19 of this blade engages the side of the fruit, for example, as illustrated in Fig. 2, the edge 19 projecting slightly beyond the guard 10. This guard may be of substantially conical form but is cut away on the side remote from the fruit to form a large opening 20, and in this opening, a deflector 21 is provided in the form of a fin which engages the peel as it comes off of the fruit, and guides it away from the guard. The knife is preferably formed so that its cutting edge 19 is disposed in a plane substantially at right angles to the axis of curvature. This enables the cutter to take off the rind in a continuous peel.

We provide means for yieldingly holding the knife in contact with the fruit. For this purpose, we prefer to provide a long coil spring 22 (see Fig. 1), one end of which is attached to a fixed bracket 23 and the other end is hooked onto the sleeve 13. As the peeling operation progresses, the sleeve 13 is moved automatically up the stem 14 and in this way, the knife travels along the fruit.

We provide automatic means for moving the sleeve 13 as described. For this purpose, the sleeves 11 and 13 may be supported by means of a cord 24 which passes in a loop around a pulley 25 on the stem 14, the lower end of the cord passing around a fixed guide pulley 26 and down to a feed shaft 27 which is mounted on the frame, and which is driven when the peeling operation is taking place. The cord 24 is attached to a winding spool 28 on this shaft.

In order to regulate the pressure of the knife against the side of the fruit, we prefer to provide a relatively fixed guide 29 which may be in the form of a curved plate extending up from the face of the table, and this guide is engaged by a finger 30 which extends down from the sleeve 11. In practice, we prefer to form this finger as part of a wire coil 31 disposed around the sleeve 11, and this coil has an arm 32 on its upper side which is connected to the cord 24. Of course, the tension of the spring 22 pulls the knife against the face of the fruit. While the knife is disposed near the lower end of the fruit, the finger 30 cooperating with the guide plate 29 assists in holding the knife up against the fruit. After the knife has passed the largest diameter of the fruit, the finger 30 may leave the bracket 29. As the knife is fed along the under side of the fruit, its vertical movement is automatically retarded by means that will be described hereinafter.

We prefer to mount the rotary spindle 2 so that it may be readily disengaged from the driving connection which rotates it. In other words, we prefer to mount the spindle on a movable part or bracket which can be swung away from the position in which the spindle is indicated in Fig. 1, and in such a way that the spindle may occupy the position in which it is indicated in dotted lines at the right. When this is done, the spindle stops rotating automatically and the operator of the machine can then remove the fruit and replace it by an unpeeled fruit. The mechanism we employ is such that when the spindle is in the position in which it is shown in full lines, a driving connection exists up through the spindle. When the spindle 2 is swung away, however, this driving connection is broken, and likewise the driving connection to the feed shaft 27 is broken. In order to accomplish this, we prefer to provide a continuously driven worm 33 (see Fig. 1), said worm being mounted on a shaft 34 which may be driven by a belt 35 passing over a pulley 36.

The spindle 2 is carried on a swinging bracket 37 which is attached to an apron 38 which is pivoted on a fixed shaft 39 by means of arms 40. The lower end of the spindle 2 is enlarged into a shaft 41 and this shaft carries a worm wheel 42 which meshes with the worm 33 when the spindle 2 is in the position indicated in Fig. 1. When the bracket 37 is swung away from the worm 33, the worm gear or worm wheel 42 breaks its connection with the worm.

The driving connection for the feed shaft 27 includes a part carried by the frame 1 and a part carried by the bracket 37, and these parts are in connection when the peeling operation is taking place. This connection includes a friction disc 43 carried by the shaft 27 and a friction pinion 44 carried on the lower end of the shaft 41. Fig. 1 illustrates the friction pinion and disc in driving engagement with each other.

The clamping spindle 4 is supported on an arm 45 extending out from a post or stanchion 45ª. The stem or spindle 4 may be adjusted by sliding it through a sleeve 46 on the end of the arm 45, and this sleeve is provided with a clamping screw 47 for clamping the fixed spindle with its end in engagement with the upper end of the fruit. The spindle 2 has a spur 48 for engaging the fruit. The arm 45 is carried on a post 45ª extending up from the apron 38.

A latch 49, in the form of a spring plate, may be provided to engage over a keeper plate 50 on the apron 38. This spring latch operates to hold the bracket 37 in its "closed" position, that is to say, in the position in which the worm wheel 42 is in engagement with the worm 33.

The general mode of operation of the machine will now be briefly outlined.

The fruit having been clamped between the live spindle 2 and the fixed spindle 4, the bracket 37 is then swung in to bring the fruit into substantially the position in which it is indicated in Fig. 1. When this occurs, the worm wheel 42 will be brought into mesh with the worm 33 and the spindle 2 will be immediately driven by the drive shaft 34. When this movement starts, the knife 5 will be located slightly below the position in which it is shown in Fig. 1. The spring 22 will pull it against the side of the fruit and as this occurs, the guide finger 30 and guide plate 29 cooperate with the spring to enable the cutter or knife to move along from a point near the spindle 2 up along the lower face of the fruit. At the same time, the friction pinion 44 rotates the friction disc 43 and rotates the feed shaft 27 so as to wind up the cord 24 on the spool 28. This will cause the cord to pull up on the free end of the cutter shaft 6. When this movement takes place, the sleeve 13 slides up on the stem 14 and a slight amount of swiveling movement takes place at the swivel joint 12. In this way, the cutter travels up toward the upper end of the fruit.

As the fruit rotates, the annular blade 17 removes the peel from the fruit. The rotation of the annular blade 17 facilitates the throwing off of the peel and also constantly presents a new part of the edge 19 of the blade to the fruit. The fin 21 operates as a deflector to assist in throwing the peel away from the knife.

When the knife is on the under side of the fruit, it should not be fed up at the same speed as when it is cutting on the side of the fruit. For this reason, we provide means for retarding the vertical feeding movement when the knife is peeling the under side of the fruit, and this means is so constructed that although the member which actuates the feed operates at uniform speed, our improvement operates to compensate for the retarding of the feeding movement at this time. This will appear from the following considerations:

When the knife is under the fruit, the vertical feeding movement of the knife should be relatively slow; but at this time the cord 24 is being taken up at the regular uniform speed. This is permitted by reason of the fact that the guide plate 29 holds the finger 30 so that the cord 24 is held deflected to one side. As the cutter moves up, the guide plate 29 permits the arm 32 to come more into line with the cord 24, and this gives extra cord to the pulley and has the effect of retarding the vertical feed.

It is understood that the embodiment of the invention described herein is only one of the many embodiments this invention may take, and we do not wish to be limited in the practice of the invention, nor in the claims, to the particular embodiment set forth.

What we claim is:

1. In a machine for peeling fruit or the like, the combination of means located on the axis of the fruit for engaging the ends only of the fruit to support it, a rotary knife, supporting means for supporting the knife enabling it to swing bodily toward the fruit in a plane transverse to the fruit's axis, means for rotating the knife on its own axis, a guard associated with the knife for engaging the face of the fruit, yielding means for yieldingly pressing the knife and its guard against the face of the fruit while the knife is removing the peeling, means for producing a relative rotation between the fruit and the knife about the axis of the fruit, means for simultaneously producing a relative movement between the fruit and the knife longitudinally of the said axis of the fruit, and guiding means for limiting the said swinging movement of said supporting means while the knife is peeling the fruit and co-operating with said yielding means to guide the knife in a path conforming to the contour of the fruit.

2. In a machine for peeling fruit or the like, the combination of means located on the axis of the fruit for engaging the ends only of the fruit to support it, a knife, a spring for pressing the knife against the face of the fruit, means for producing relative rotation between the fruit and the knife about the fruit's axis, means for simultaneously producing a relative movement between the fruit and the knife longitudinally of the fruit's axis, and a cam for limiting the movement of the knife toward the fruit while the knife is peeling the fruit, and co-operating with the said spring to guide the knife in a path conforming to the contour of the fruit.

3. In a machine for peeling fruit, the combination of an annular cutter, means for rotating the cutter on its own axis, means for producing a relative movement of the cutter along the fruit, means for producing a relative movement of the cutter around the fruit, means for yieldingly pressing the cutter toward the surface of the fruit and a cam co-operating with the last named means to limit the movement of the cutter toward the fruit and cause the cutter to follow the contour of the fruit while peeling it.

4. In a machine for peeling fruit, the combination of a frame, means for supporting and rotating the fruit on its longitudinal axis and held in a substantially vertical plane, a peeling knife, a substantially horizontal shaft carrying the same with a flexible connection through which the shaft and knife may be rotated, means for suspending the shaft at a point removed from said flexible connection, means mounted on the frame for shifting the shaft laterally in a substantially vertical plane, and spring means for yieldingly holding the peeling knife against the side of the fruit.

5. In a machine for peeling fruit, the combination of means for supporting and rotating the fruit on its longitudinal axis, a peeling knife, a shaft carrying the same with a flexible connection through which the shaft and knife may be rotated, means for suspending the shaft at a point removed from said flexible connection, means for yieldingly swinging the shaft on the said flexible connection so as to move it in a plane transverse to the axis of the fruit, to hold the peeling knife against the side of the fruit, and means driven by the machine for shifting the shaft laterally so as to move the peeling knife progressively along the fruit.

6. In a machine for peeling fruit, the combination of means for supporting and rotating the fruit with its longitudinal axis in a substantially vertical position, a relatively long cutter shaft extending transversely to the axis of rotation of the fruit, a peeling knife carried by the shaft, a flexible connection for the shaft located remote from the position of the fruit, and through which the shaft may be rotated, means for supporting the shaft from above and for guiding the same to swing substantially vertically adjacent the axis of rotation of the fruit, means for yieldingly holding the peeling knife against the side of the fruit, and means for shifting the cutter shaft laterally by swinging it on said flexible connection, to move the peeling knife along the face of the fruit as the peeling operation progresses.

7. In a fruit peeling machine, the combination of means for supporting and rotating the fruit with its longitudinal axis in a substantially vertical plane, a stem with means for suspending the same in a substantially vertical position near the position of the fruit, a sleeve guided to slide on the stem, a cutter shaft rotatably supported on the sleeve and having a flexible connection through which the same may be rotated, a rotary knife carried by the cutter shaft, means for yieldingly holding the knife against the side of the fruit, and means for moving the sleeve along the stem as the cutting operation progresses to move the knife along the face of the fruit.

8. In a fruit peeling machine, the combination of a rotary spindle for rotatably supporting the fruit with its longitudinal axis in a substantially vertical position, a stem with means for suspending the same near the position of the fruit, a sleeve guided to slide up or down on the stem, a cutter-shaft supported on the sleeve and having a flexible connection through which the same may be rotated, a peeling knife carried by the shaft, means for yieldingly forcing the sleeve and shaft laterally so as to press the peeling knife against the face of the fruit, and automatic means for moving the sleeve along the stem as the peeling operation progresses to move the knife from end to end of the fruit.

9. In a machine for peeling elongated fruit, the combination of means for supporting and rotating the fruit on its longitudinal axis, a floating shaft, a peeling knife carried thereby, a flexible connection through which the cutter shaft may be rotated, means for pulling the floating shaft laterally to press the knife against the face of the fruit, automatic means for shifting the shaft laterally by rotation about the flexible connection as the peeling operation progresses, to move the knife from end to end of the fruit, a relatively fixed guide permitting freedom of movement of the knife toward the fruit in peeling the stem-end of the fruit, and means engaging the same for guiding the peeling knife only as it moves along the flower-end of the fruit.

10. In a machine for peeling pears, the combination of a substantially vertical spindle for rotatably supporting the fruit with its flower-end down, and with its longitudinal axis in a substantially vertical position, a cutter shaft with a flexible connection through which the same may be rotated, guiding means for the shaft extending substantially parallel with the axis of rotation of the spindle permitting free movement of the knife toward the pear while it is peeling the upper portion of the pear, a peeling knife carried by the cutter shaft, a spring for pulling the cutter shaft laterally to hold the peeling knife against the face of the fruit, and automatic means for swinging the cutter shaft on said flexible connection, operating to move the shaft along said guiding means as the knife moves along the face of the fruit at its flower-end.

11. In a machine for peeling fruit, the combination of a rotary spindle for supporting and rotating the fruit with its longitudinal axis in a substantially vertical position, a cutter shaft extending transversely to the axis of the spindle and having a flexible connection through which the same may be rotated, guiding means suspended from above freely movable toward the axis of rotation of the fruit for guiding the end of the shaft that carries the cutter, in a substantially vertical direction, spring means for yieldingly pulling the cutter shaft toward the fruit to hold the cutter yieldingly against the fruit, a relatively fixed guide, means for moving the end of the shaft along the first named guiding means progressively as the peeling operation progresses, and a finger guide to guide the cutter as it passes along the face of the fruit.

12. In a machine for peeling fruit, the combination of a frame, a driving gear mounted on the frame, a movable bracket, a rotary spindle carried by the bracket for supporting and rotating the fruit on its axis, a gear mounted on the bracket for driving the rotary spindle, adapted to mesh with the first named gear to drive the spindle, and operating to disengage itself from the same when the bracket is moved away from the driving gear, a rotary knife, means for holding the same in contact with the face of the fruit as it rotates, and means for moving the knife progressively along the face of the fruit as the peeling operation progresses.

13. In a machine for peeling fruit, the combination of a relatively fixed frame, a continuously driven gear supported on the frame, a bracket pivotally mounted on the frame to swing toward or from the gear, a rotary spindle carried by the bracket for supporting and rotating the fruit on its longitudinal axis, a gear mounted on the bracket to engage with the first named gear when the bracket is swung toward the same and adapted to disengage itself from the same when the bracket is moved away, a rotary knife, a shaft for supporting and rotating the knife, means for holding the knife in contact with the face of the fruit as it rotates, and means for moving the knife progressively along the face of the fruit as the peeling operation progresses.

14. In a machine for peeling fruit, the combination of a relatively fixed frame, a continuously driven worm mounted on the frame, a bracket pivotally supported on the frame to swing toward or from the worm, a rotary spindle carried by the bracket for supporting and rotating the fruit on its longitudinal axis, a worm-wheel mounted on the bracket for driving the rotary spindle, adapted to mesh with the worm when the bracket is swung toward the same, and operating to disengage itself from the worm when the bracket is swung away, a rotary knife, means for holding the same in contact with the face of the fruit as it rotates, and means for moving the knife progressively along the face of the fruit as the peeling operation progresses.

15. In a machine for peeling fruit, the combination of a relatively fixed frame, a continuously driven worm mounted on the frame, a bracket pivotally supported on the frame to swing toward or from the worm, a rotary spindle carried by the bracket for supporting and rotating the fruit on its longitudinal axis, a worm-wheel mounted on the bracket for driving the rotary spindle, adapted to mesh with the worm when the bracket is swung toward the same, and operating to disengage itself from the worm when the bracket is swung away, a rotary knife, means for holding the same in contact with the face of the fruit as it rotates, and means driven by the worm wheel for moving the knife progressively along the face of the fruit as the peeling operation progresses.

16. In a machine for peeling fruit, the combination of a fixed frame, a continuously driven gear mounted on the frame, a movable bracket mounted on the frame and capable of being moved toward or from the driven gear, a rotary spindle carried by the bracket for supporting and rotating the fruit, a gear mounted on the bracket for driving the rotary spindle, adapted to mesh with the first named gear to rotate the fruit when the bracket is swung toward the continuously driven gear, and operating to disengage itself from the continuously driven gear when the bracket is moved away from the same, a rotary peeling knife, means for holding the same in contact with the face of the fruit as it rotates, and means for moving the knife progressively along the face of the fruit as the peeling operation progresses, including a part of a driving connection mounted on the frame and a part of a driving connection meshing therewith, and driven by the gear on the movable bracket.

17. In a machine for peeling fruit, the combination of a frame, a continuously driven worm mounted on the frame, a bracket pivotally mounted on the frame to swing toward and from the worm, a worm-wheel carried by the bracket for meshing with the worm when the bracket is swung toward the same, and operating to disengage itself from the worm when the bracket is moved away, a rotary spindle carried by the bracket and driven by the worm wheel for supporting and rotating the fruit on its axis, a cutter shaft extending transversely to the axis of the spindle, a guide for the cutter shaft extending substantially parallel with the axis of the spindle, a feed shaft supported on the frame, having a driven wheel, a driving wheel for the last named driven wheel actuated by the worm wheel for driving the feed shaft during the peeling operation, and means connecting the feed shaft with the end of the cutter shaft for moving the same along the guiding means when the peeling operation is progressing.

18. In a machine for peeling fruit and the like, means for supporting and rotating the fruit on a substantially vertical axis, a cutter, means for feeding the cutter up the side of the fruit, and means for retarding the vertical feeding movement when the cutter is moving along the under side of the fruit.

19. In a machine for peeling fruit and the like, means for supporting and rotating the fruit on an axis, a cutter, means for feeding the cutter up the side of the fruit, and means associated therewith to compensate for the slow vertical movement of the knife required when the cutter is moving along the under side of the fruit.

20. In a machine for peeling fruit and the like, means for supporting and rotating the fruit on an axis, a cutter, a cord connected with the cutter to move the same vertically up the side of the fruit, means for taking up the cord at a substantially constant speed, and a connection between the cord and the cutter with a co-operating relatively fixed guide operating to deflect the cord when the cutter is moving along the under side of the fruit, and operating to retard the vertical movement of the cutter when under the fruit.

21. In a machine for peeling fruit and the like, means for supporting and rotating the fruit on an axis, a cutter shaft with a cutter thereon for engaging the side of the fruit, means for pressing the cutter against the side of the fruit, a relatively fixed guide, a finger rotatably mounted on the shaft for engaging the guide and having an arm extending upwardly, a feed cord attached to the arm, and automatic means for winding up the cord to move the cutter up the side of the fruit, said guide cooperating with the finger to move the arm when the cutter is under the fruit, to deflect the cord and retard the vertical feeding movement of the knife when under the fruit.

22. In a fruit peeling machine, the combination of means for supporting and rotating the fruit on a vertical axis, a substantially horizontal cutter shaft having a flexible connection for driving the same, a cutter on the cutter shaft, means for yieldingly pulling the cutter shaft in a substantially horizontal direction to hold the cutter against the side of the fruit, and means driven by the machine for feeding the cutter shaft in a substantially vertical direction so as to move the cutter along the length of the fruit.

23. In a fruit peeling machine, the combination of means for supporting and rotating the fruit on a substantially vertical axis, a substantially horizontal cutter shaft having a flexible connection, a suspended guide for guiding the shaft to swing in a substantially vertical direction, a cutter on the cutter shaft, a spring for yieldingly pulling the cutter shaft in a substantially horizontal direction to hold the cutter against the face of the fruit, and means for swinging the cutter shaft upwardly on the guiding means to move the cutter throughout the length of the fruit.

Signed at San Francisco, Calif., this 19th day of June, 1926.

HJALMAR GORANSON.
DAVID GORANSON.